United States Patent [19]
Fujita et al.

[11] Patent Number: 5,109,148
[45] Date of Patent: Apr. 28, 1992

[54] POSITIONING DEVICE FOR A MACHINING APPARATUS

[75] Inventors: Masahiro Fujita; Takao Bamba, both of Amagasaki, Japan

[73] Assignee: Mitsubishi Denki Kabushiki Kaisha, Tokyo, Japan

[21] Appl. No.: 645,843

[22] Filed: Jan. 25, 1991

[30] Foreign Application Priority Data

| Jan. 26, 1990 [JP] | Japan | 2-17122 |
| Apr. 3, 1990 [JP] | Japan | 2-88854 |
| Oct. 22, 1990 [JP] | Japan | 2-283839 |

[51] Int. Cl.$^5$ .................................... B23K 26/02
[52] U.S. Cl. ................... 219/121.82; 219/121.78; 219/121.83
[58] Field of Search .............. 219/121.82, 121.83, 219/121.78, 124.34, 125.1; 318/578, 574, 577, 571, 561, 540

[56] References Cited

U.S. PATENT DOCUMENTS

| 4,203,064 | 5/1980 | Suzuki et al. | 318/561 X |
| 4,215,299 | 7/1980 | Edwin et al. | 318/576 X |
| 4,760,237 | 7/1988 | Mizukado et al. | 219/121.82 |
| 4,851,637 | 7/1989 | Puozzo et al. | 219/121.78 |
| 4,977,512 | 12/1990 | Nakagawa | 364/474.08 X |

FOREIGN PATENT DOCUMENTS 60-40682 3/1985 Japan .

OTHER PUBLICATIONS

Brochure on Carbon Dioxide Gas Laser Machining Apparatus from Mitsubishi Electric Corporation, 1989.

*Primary Examiner*—C. L. Albritton
*Attorney, Agent, or Firm*—Rothwell, Figg, Ernst & Kurz

[57] ABSTRACT

A positioning device for a machining apparatus includes at least two independent driving mechanisms for movably adjusting a relative position of a work with respect to the machining head along at least one direction, wherein a first driving mechanism has greater inertia than a second driving mechanism. A first servo control system controls the first driving mechanism in accordance with a target value of a relative position of the work with respect to the head. A second servo control system controls the second driving mechanism utilizing as a target command value thereof an error of the first control system with respect to said target value, such that the relative position of the work with respect to the head is controlled to the target value of the relative position of the work with respect to the head.

11 Claims, 9 Drawing Sheets

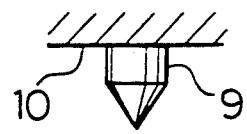
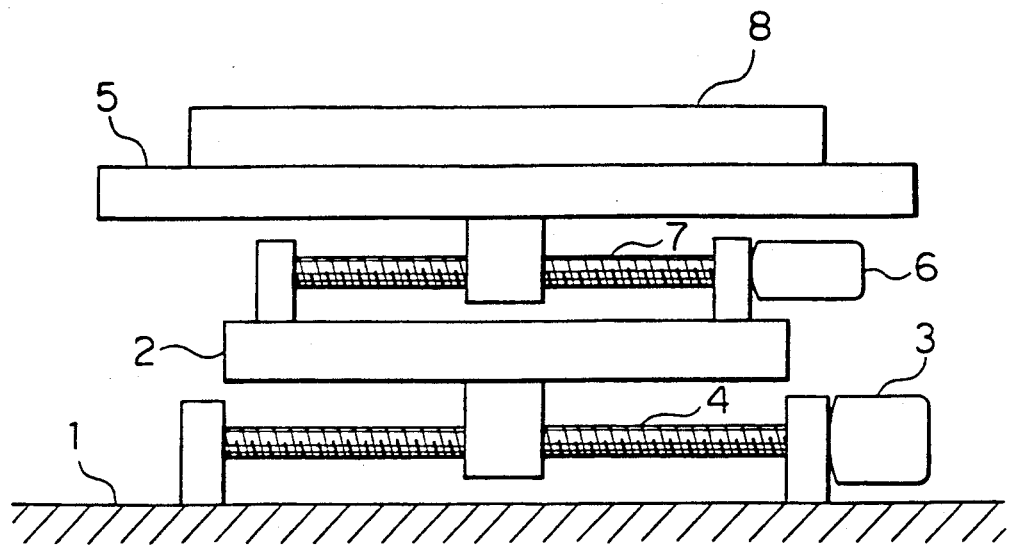
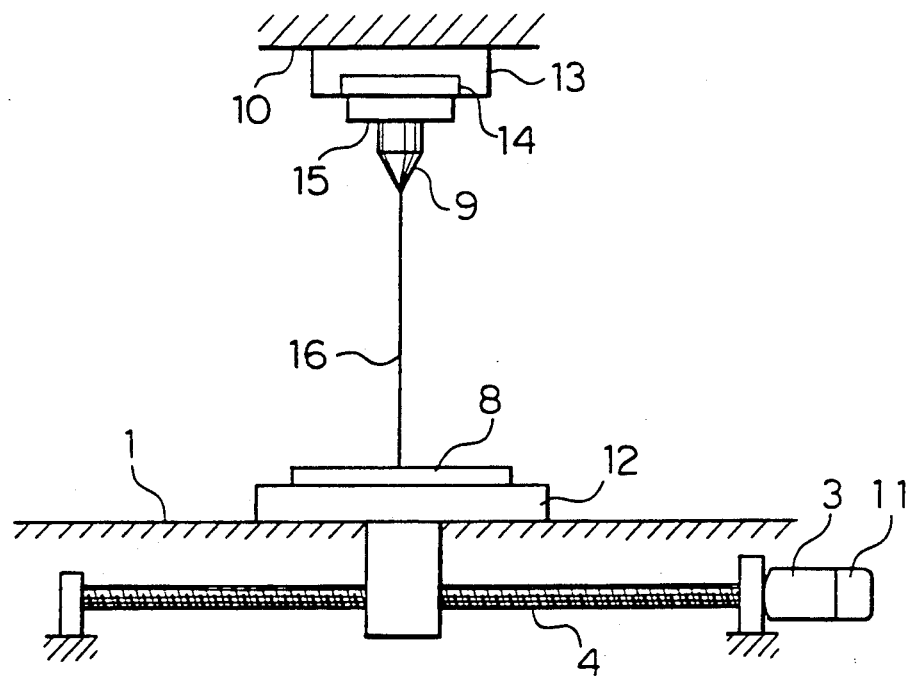

POSITIONING DEVICE FOR A MACHINING APPARATUS

BACKGROUND OF THE INVENTION

This invention relates to positioning devices for machining apparatus, such as laser beam machining apparatus, and more particularly to high-speed high-precision positioning devices with a long position adjustment stroke.

FIG. 1 is a schematic view of a conventional positioning device for a machining apparatus silimar to that disclosed in Japanese Laid-Open Patent Application (Kokai) No. 63-300837. The device of FIG. 1 comprises a coarse and a fine adjustment mechanism to realize a high-speed high-precision positioning. Thus, a coarse adjustment table 2 is translated on a bottom base 1 via a motor 3 driving a ball thread 4. Further, a fine adjustment table 5 carrying a work 8 thereon is translated on the coarse adjustment table 2 via another motor 6 driving a ball thread 7. A machining head 9 is fixedly supported on a top base 10 above the work 8.

The method of operation of the device of FIG. 1 is as follows. The coarse adjustment table 2 is driven linearly relative to the bottom base 1 via the ball thread 4 driven by the motor 3. Further, the fine adjustment table 5 is driven linearly relative to the coarse adjustment table 2 via the ball thread 7 driven by the motor 6. Thus, the work 8 is translated with respect to the fixed machining head 9 by a linear distance equal to the sum of the translation of the coarse adjustment table 2 relative to the base 1 and the translation of the fine adjustment table 5 relative to the coarse adjustment table 2. The lead of the thread 7 is selected smaller than that of the thread 4 such that a rough adjustment of the work 8 is effected via the rough adjustment table 2, while a fine adjustment is effected via the fine adjustment table 5. Thus, a rapid and precise positioning of the work 8 is realized.

FIG. 2 shows another conventional positioning device for a laser machining apparatus, which is disclosed in a brochure: "Mitsubishi Carbon Dioxide Gas Laser Machining Device", March 1989, of Mitsubishi Denki Kabushiki Kaisha. The device is capable of adjusting the relative position of the machining head with respect to the work in three mutually perpendicular directions X, Y, and Z. (The X- and the Y-axes represent mutually perpendicular horizontal directions, while the Z-axis represents the vertical direction.) Thus, a table 30 carrying the work 8 is translated in the direction X by the X-axis driving mechanism 31. On the other hand, the machining head 9, radiating a machining beam 16 is carried on a Y-axis directional driving mechanism 32 via a Z-axis directional driving mechanism 33, such that the head 9 may be moved along the directions of the Y- and the Z-axes. The Y-axis driving mechanism 32 drives and translates along the direction of the Y-axis and the Z-axis mechanism 33 and the head 9, while the Z-axis driving mechanism drives and translates the head 9 along the direction of the Z-axis. Thus, the head 9 can be moved in three dimensions relative to the work 8. The respective driving mechanism 31, 32, and 33 are controlled to target positions by a servo control system.

The devices of FIGS. 1 and 2, however, have this disadvantage: Since the inertial load on the driving mechanism is great, high-speed high-precision positioning is difficult to accomplish. In the case of the device of FIG. 1, the work 8 and the fine adjustment table 5 constitute an inertial load for the motor 6, while the work 8, the fine adjustment table 5 and the coarse adjustment table 2 constitute an inertial load for the motor 3. Both loads are large, especially in the case where the weight of the load 8 is large. Thus, in the case where relative position of the work 8 with respect to the head 9 must be adjusted at a high-speed, the movement of the work 8 cannot follow the command value closely, due to the large inertia of the load on the driving mechanism. In the case of the device of FIG. 2, the table 30 and the work 8 constitute an inertial load for the X-axis driving mechanism 31, and the Z-axis mechanism 33 and the head 9 constitute an inertial load for the Y-axis mechanism. Both loads are extremely large, such that when relative position of the work 8 with respect to the head 9 is to be adjusted at a high-speed, the movement of the work 8 and the head 9 cannot follow the command values closely, due to the large inertia of the loads on the driving mechanisms. Thus, both in the case of the devices of FIGS. 1 and 2, it is necessary to drive the work or the head slowly in order to accomplish an enhanced precision. This greatly reduces the machining efficiency.

SUMMARY OF THE INVENTION

It is therefore a primary object of this invention to provide a positioning device for a machining apparatus, etc., which is enhanced both in the positioning speed and precision.

The above object is accomplished in accordance with the principle of this invention by a positioning device for movably adjusting a relative position of a first body (e.g., a work) with respect to a second body (e.g., a machining head of a machining apparatus), comprising: at least two independent driving mechanisms for movably adjusting a relative position of said first body with respect to said second body along at least one direction, wherein a first driving mechanism has greater inertia than a second driving mechanism; a first servo control system for controlling said first driving mechanism in accordance with a target value of a relative position of the first body with respect to the second; and a second servo control system for controlling said second driving mechanism utilizing as a target command value thereof an error of said first control system with respect to said target value, such that the relative position of said first body with respect to said second body is controlled to said target value of the relative position of the first body with respect to the second body.

Preferably, the positioning device comprises: a first table for carrying said first body fixedly thereon; a first driving mechanism for translating said first table at least along one direction; a second table for carrying said second body fixedly thereon; a second driving mechanism for translating said second table at least along said one direction, said second mechanism having a smaller inertia than said first driving mechanism; a first servo control system for controlling said first driving mechanism, said first servo control system controlling a position of said first table along said one direction in accordance with a target value of a relative position of the first body with respect to the second body; and a second servo control system for controlling said second driving mechanism, said second servo control system controlling a position of said second table along said direction utilizing as a target command value of the position of the second table a positional error of said first control system with respect to said target value, such that the relative position of said first body with respect to said second body is controlled to said target value of the relative position of the first body with respect to the second body.

In the case of two or three dimentional positioning device, it is preferred that the positioning device comprises: a first table for carrying said first body fixedly thereon; a first table driving mechanism for translating said first table at least along one direction X; a third table for carrying said second body fixedly thereon; a third table driving mechanism for translating said third table at least along two mutually perpendicular directions X and Y, one of said two mutually perpendicular direction, X, agreeing with said one direction X along which said first table is translated; a second table for carrying said third table fixedly thereon; a second table driving mechanism for translating said second table at least along said direction Y along which said third table is translated; wherein said third table driving mechanism has a smaller inertia than said first and second driving mechanisms; a first servo control system for controlling said first and second table driving mechanisms, said first servo control system controlling positions of said first and second tables along said directions X and Y, respectively, in accordance with target values of relative positions of the first body along directions X and Y, respectively, with respect to the second body; and a second servo control system for controlling said third table driving mechanism, said second servo control system controlling positions of said third table along said directions X and Y utilizing, as target command values of the positions of the third table, positional errors along said directions X and Y, respectively, of said first control system with respect to said target values, such that the relative positions of said first body with respect to said second body along said directions X and Y are controlled to said target values of the relative positions of the first body with respect to the second body along said directions X and Y.

BRIEF DESCRIPTION OF THE PREFERRED EMBODIMENTS

The novel features which are believed to be characteristic of this invention are set forth with particularity in the appended claims. This invention itself, however, both as to its organization and method of operation, together with further objects and advantages thereof, may best be understood from the detailed description of the preferred embodiments, taken in connection with the accompanying drawings, in which:

FIG. 1 is a side view of a conventional positioning device for a laser beam machining apparatus;

FIG. 3 shows a positioning device for a laser beam machining device according to this invention, wherein FIG. 3(a) is a side view and FIG. 3(b) is a block diagram of the control system of the positioning device;

FIG. 7 is a perspective view of a three-dimensional positioning device of a laser beam machining apparatus according to this invention.

In the drawings, like reference numerals represent like or corresponding parts.

DETAILED DESCRIPTION OF THE PREFERRED EMBODIMENTS

Figure 3B:
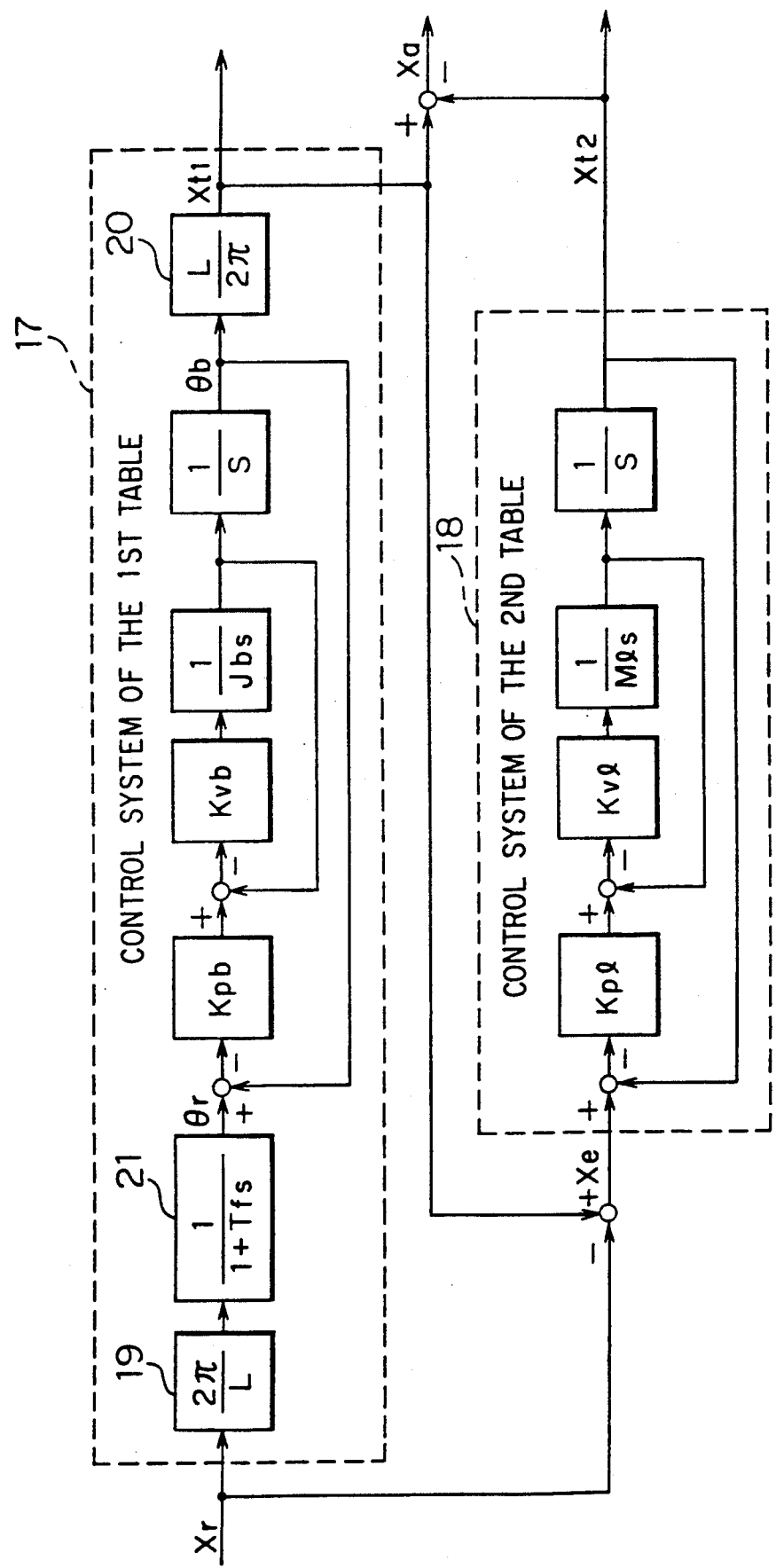

Referring now to FIG. 3(a) and (b), a positioning device according to a first embodiment of this invention is described. FIG. 3(a) is a schematic side view of the positioning device, while FIG. 3(b) is a block diagram showing the organization of the control system of the positioning device. In FIG. 3, the parts similar or corresponding to those of FIG. 1 are represented by the same reference numerals.

As shown in FIG. 3(a), a first table 12 carrying a work 8 fixedly thereon is translated horizontally on the bottom base 1 by a motor 3 via a ball thread 4. A position and velocity sensor 11 detects the position and the velocity of the motor 3 and the work 8. On the other hand, a machining head 9 radiating a machining beam 16 on the work 8 is supported on a second table 15 driven horizontally by a linear motor 13 mounted on the top base 10. A linear scale (linear encoder) 14 detects the position and the velocity of the second table 15 and the head 9. The work 8 and the head 9 are thus translated in the same or opposite horizontal direction.

The movements of the first and the second tables 12 and 15 are effected by the respective control systems 17 and 18 shown in FIG. 3(b). The control system 17 for controlling the movement of the first table 12 controls the motor 3 in accordance with the target position Xr of the first table 12 relative to the head 9 or the second table 15. The actual position Xt1 of the first table 12 may have a follow-up error Xe (the error resulting from the fact that the movement of the controlled body is delayed with respect to the variations of the command value due to the inertia thereof, etc.) with respect to the target position Xr thereof. The control system 18 for controlling the movement of the second table 15 controls the linear motor 13 such that the follow-up error Xe is compensated for by the movement Xt2 of the second table 15, and that the actual position Xa of the first table 12 relative to the second table 15 is controlled to the target value Xr thereof. Since the inertia of the second table 15 is small, the control response thereof is quick. Thus, the position Xa of the first table 12 relative to the second 15 is controlled quickly and precisely to the target value Xr thereof.

In FIG. 3(b), the target relative position Xr of the first table 12 relative to the second table 15, which is inputted to the control system 17 for the first table 12, is converted via a linear-to-rotation conversion factor $(2\pi/L)$ 19 and smoothing filter 21 into a target rotational position $\theta r$ of the motor 3. The characters L in the conversion factor 19 represents the lead of the ball thread 4, while Tf represents the time constant of the filter 21. The actual rotational position $\theta b$ of the motor 3 is controlled to the target position $\theta r$ via the feedback or servo control system having a position control gain Kpb, a velocity control gain Kvb, and an overall inertia Jb including the motor 3, the ball thread 4, and the first table 12, etc. The actual position Xt1 of the first table 12 relative to the bottom base 1 is obtained from the rotational position $\theta b$ of the motor 3 and the rotation-to-linear conversion factor $(L/2\pi)$ 20.

The follow-up error Xe of the first table 12, or the difference between the target relative position Xr and the actual relative position Xt1 of the first table 12, is inputted to the control system 18 for the second table 15. The actual position of the second table Xt2 relative to the top base 10 is controlled to the target value thereof (i.e., the follow-up error Xe inputted to the control system 18) via a feedback or servo control system having a position control gain Kpl, a velocity control gain Kvl, and an overall inertia or mass Ml including the movable part of the linear motor 13 and the second table 15. Thus, the actual position Xa of the first table 12 relative to the second table 15 (i.e., the actual position of the head 9 relative to the work 8) is controlled to the target value Xr thereof. Since the inertia Ml of the second control system 18 is small, the response thereof is quick. Thus, the relative position Xa can be controlled to the target value Xr quickly and precisely.

In the control system 17 for the first table 12, the smoothing filter 21 smoothes the target rotational position θr of the motor 3. Thus, the smoothing filter 21 is effective in reducing the load on the actuator (the motor 3) and the mechanical system (the ball thread 4, etc.) of the control system 17 for the first table 12, especially in the case where the inertia or mass of the first control system 17 is large. The follow-up error Xe which may result from the first control system 17 having the smoothing filter 21 is compensated for by the movement of the second table 15. Since the inertia of the second control system 18 is small, the second table 15 can be moved quickly to compensate for the follow-up error Xe of the first table 12. By the way, the movement stroke of the second table 15 does not need to be long. The overall movement stroke of the positioning device can be made as long as desired, by combining the second table 15 of a short stroke with the first table 12 having a long movement stroke.

Figure 4:
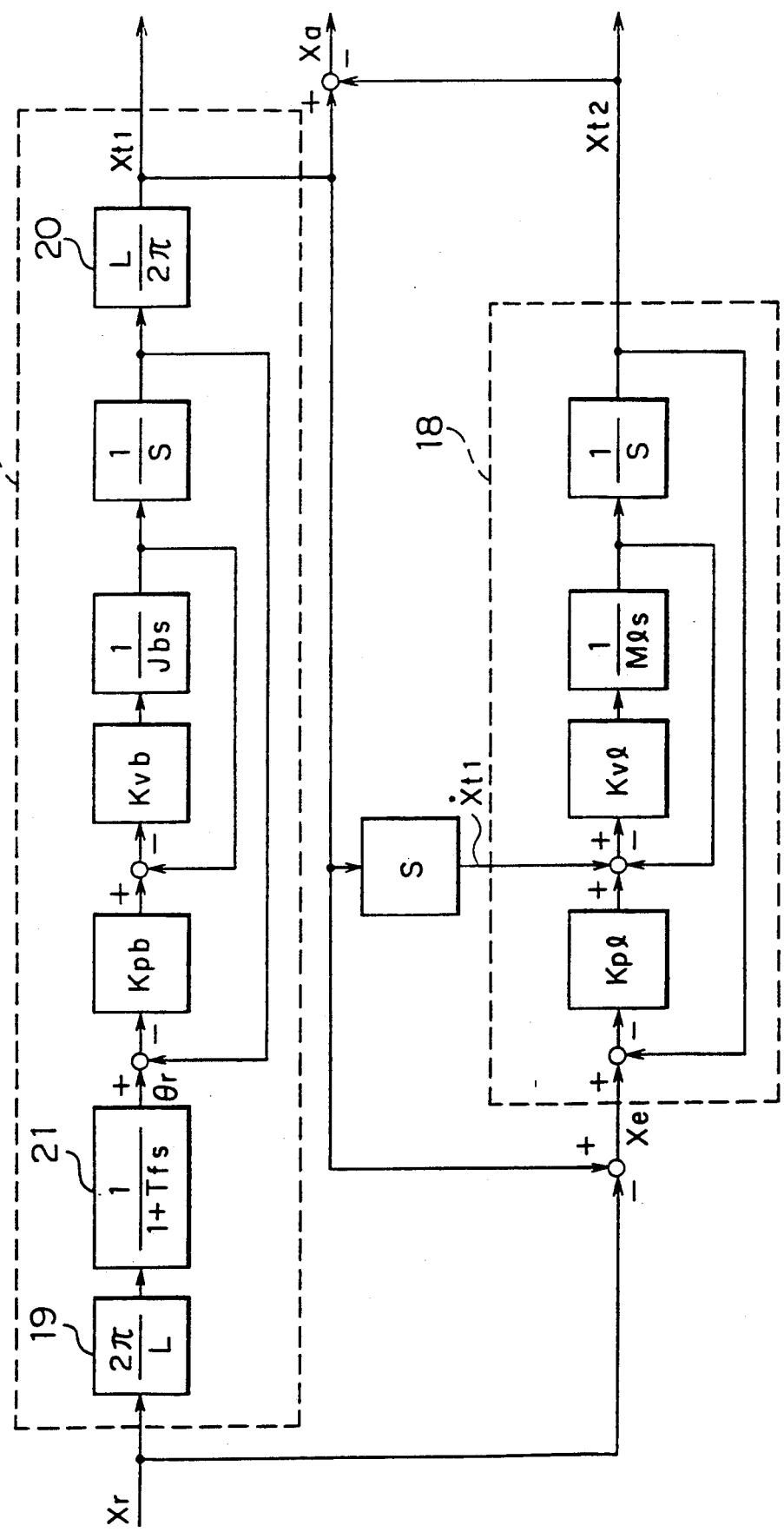
FIGS. 4 through 7 are block diagrams showing alternative organizations of the control system of the positioning device according to this invention.

There may still be an appreciable delay in the response of the second control system 18 of FIG. 3(b). Under such circumstances, there remains a follow-up error in the position Xa of the first table 12 relative to the second table 15. FIG. 4 shows a modified control system, wherein the velocity Xt1 of the first table 12 is inputted to the control system 18 for the second table 15 as a velocity command value, together with the follow-up error Xe. The response characteristics of the overall control system of FIG. 4 can be rendered subtantially equal to that of the control system 18 for the second table 15, thereby further reducing the positional error of the first table 12 relative to the second table 15.

In the above embodiments, only the positional follow-up error Xe of the first table 12 is inputted to the control system 18. The velocity follow-up error $\dot{X}e$ or the acceleration follow-up error $\ddot{X}e$ may also be utilized to control the movement of the second table 15 by means of the control system 18.

Figure 5:
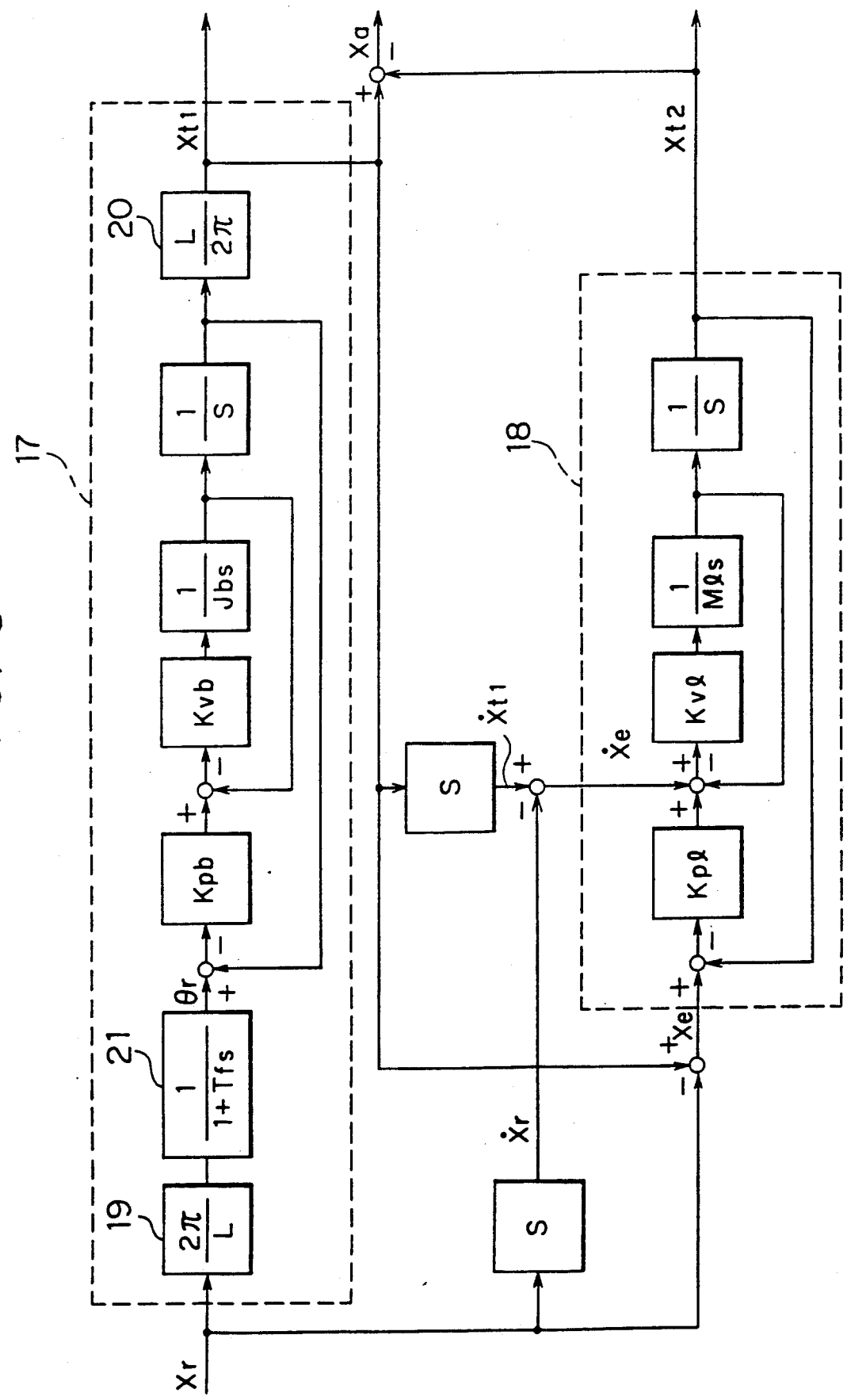

FIG. 5 shows a control system in which the velocity follow-up error $\dot{X}e$ of the first table 12, i.e., the difference between the command value $\dot{X}r$ of the relative velocity of the first table 12 (the derivative of the command value Xr of the relative position of the first table 12) and the actual relative velocity $\dot{X}t1$ of the first table 12, is inputted to the control system 18 for the second table 15 as the velocity command value. The positional error of the first table 12 relative to the second table 15 can thus further be reduced.

Figure 6:
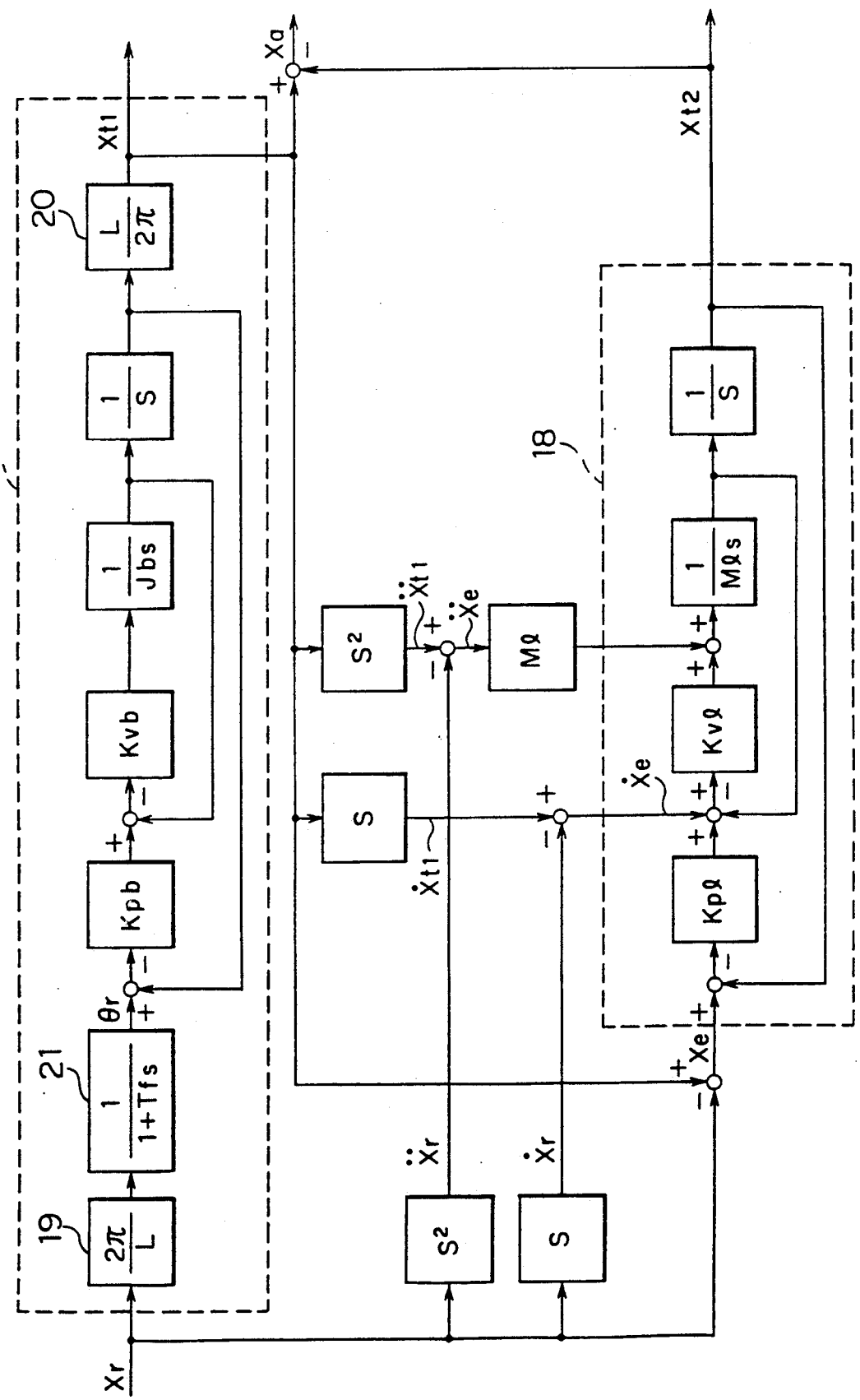

FIG. 6, on the other hand, shows a control system in which, not only the velocity follow-up error $\dot{X}e$, but also the relative acceleration follow-up error $\ddot{X}e$, multiplied with the mass Ml of the linear motor 13 and the second table 15, is inputted to the second control system 18 as a command value of the driving force of the linear motor 13. The relative acceleration error $\ddot{X}e$ is the difference between the command value $\ddot{X}r$ of the relative acceleration of the first table 12 (or the second order derivative $\ddot{X}r$ of the command value Xr of the relative position of the first table 12) and the actual acceleration $\ddot{X}t1$ of the first table 12. The control system of FIG. 6 is capable of compensating for the positional error caused by the inertia of the second control system 18, and thus realizes a more precise control.

Figure 2:
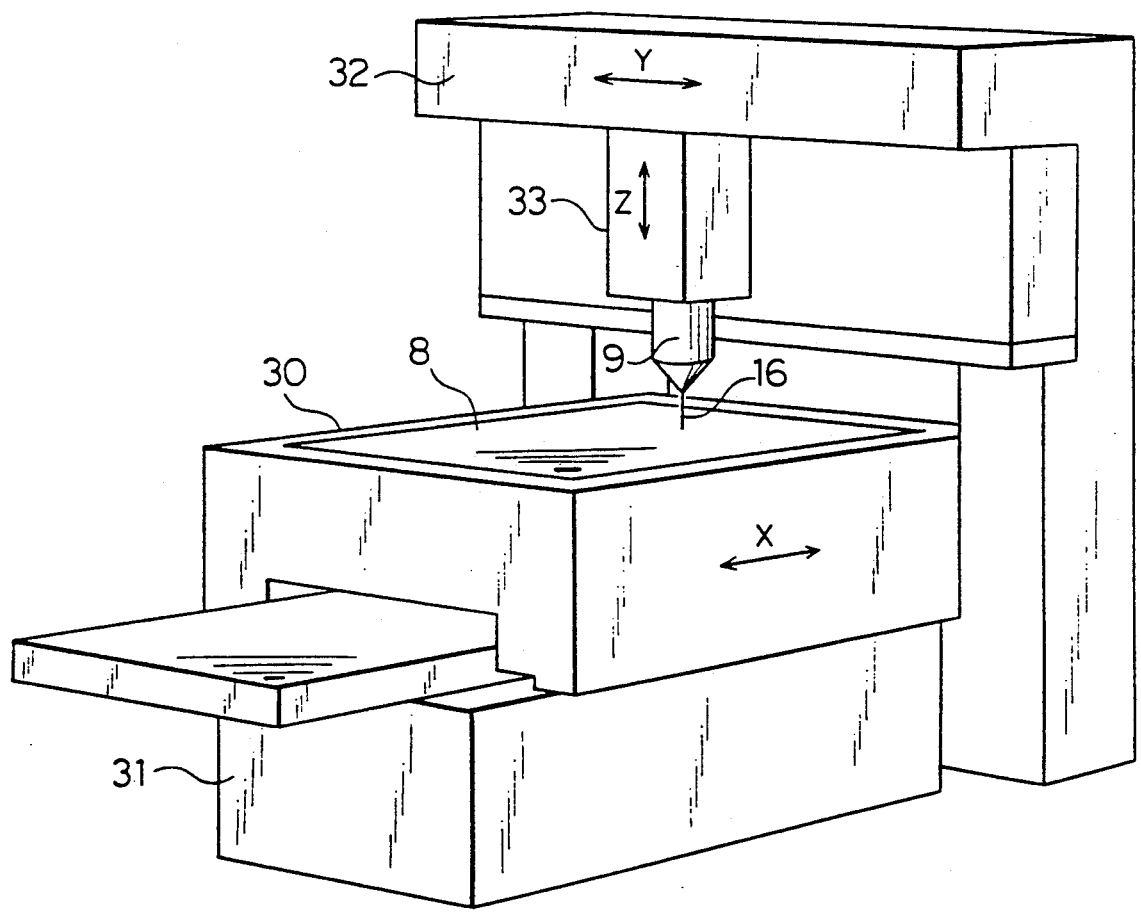
FIG. 2 is a perspective view of another conventional positioning device for a laser beam machining apparatus.
Figure 7:
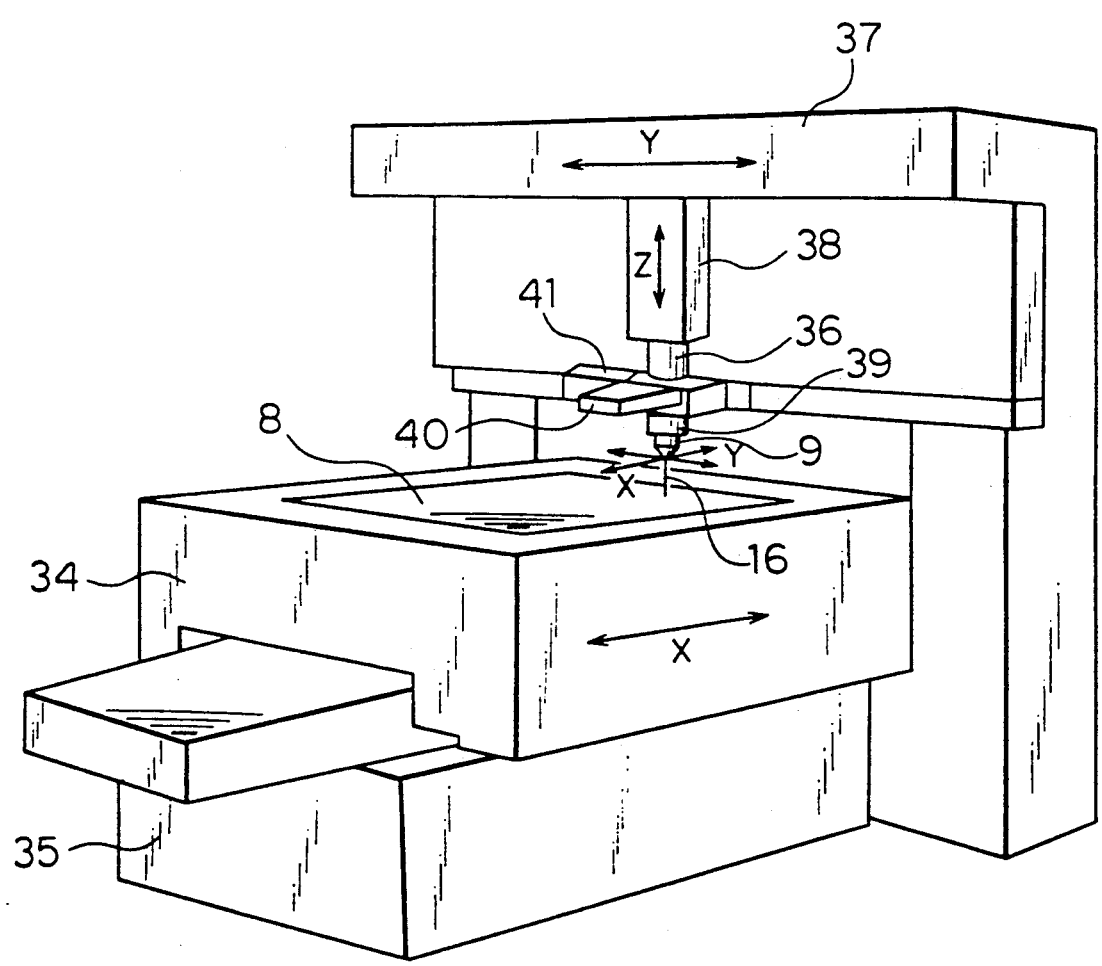
Figure 8:
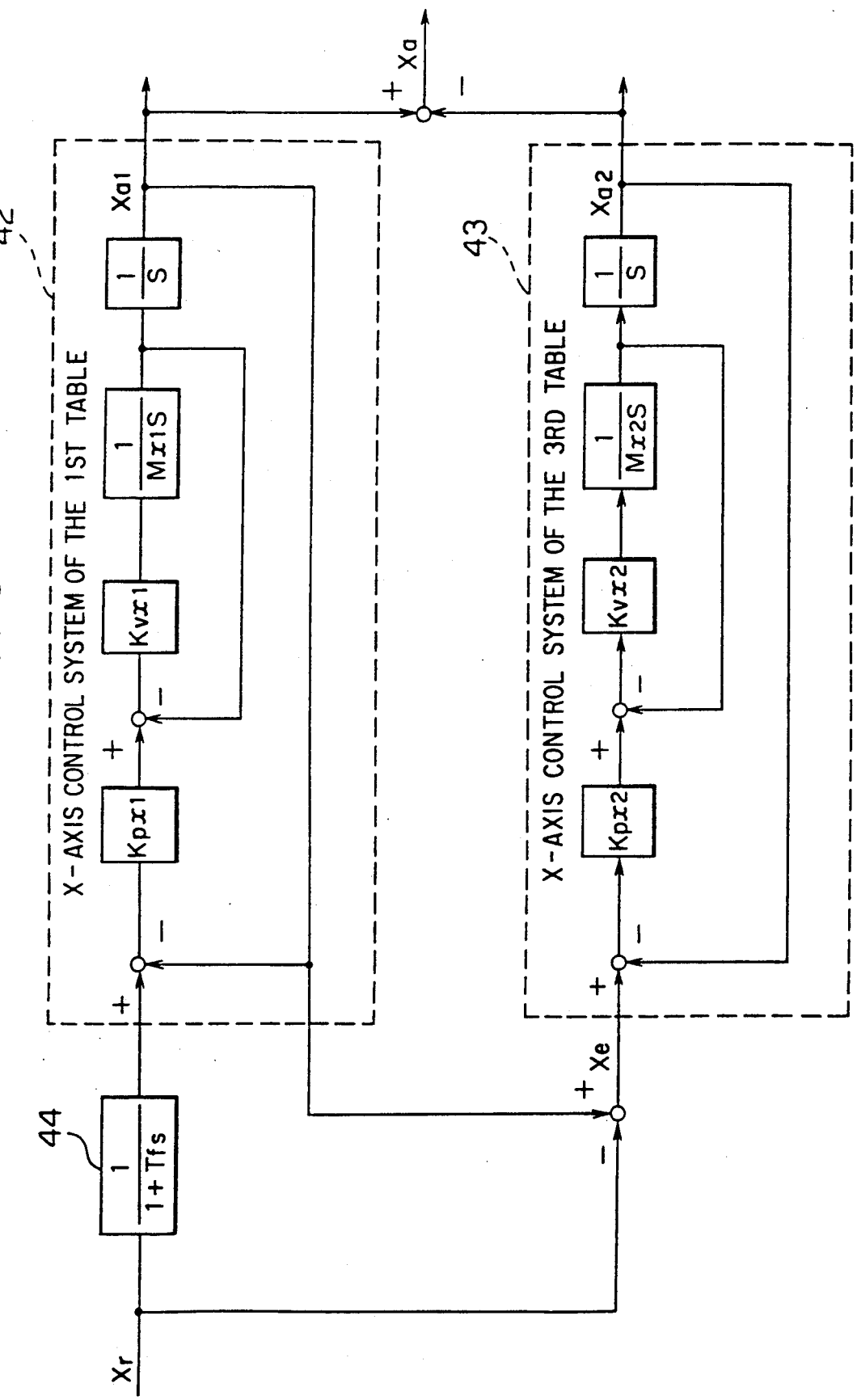
FIGS. 8 and 9 are block diagrams showing the organizations of the X- and Y-directional control systems, respectively, of the positioning device of FIG. 7.
Figure 9:
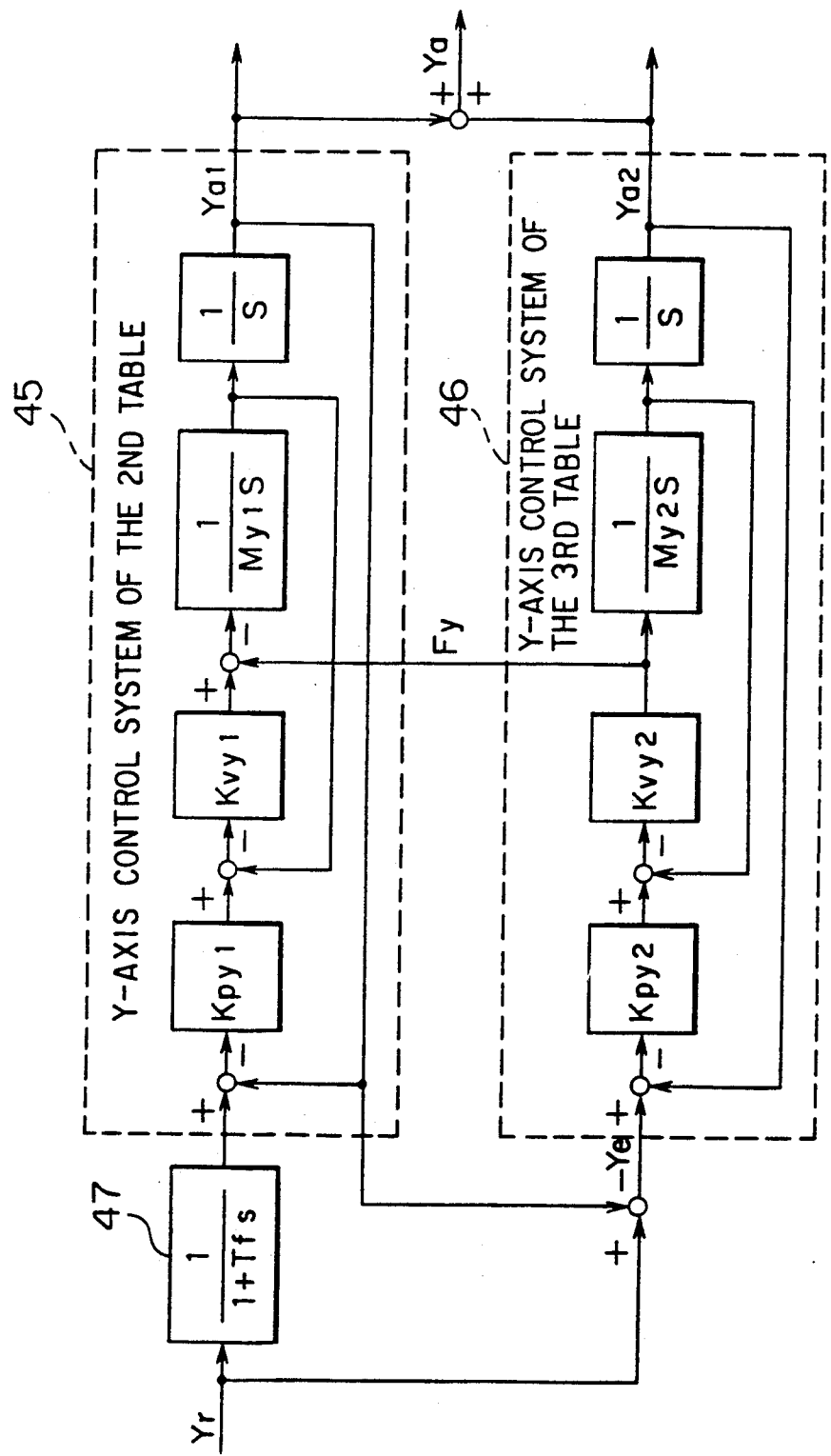

The above embodiments relates to the case where the relative movement of the work and the machining head is one-dimensional (i.e., the case where the first and the second tables are moved only in one direction). The principle of this invention, however, is applicable to two- or three-dimensional positioning devices. FIGS. 7 through 9 show a three-dimensional positioning device according to this invention, wherein the positioning controls along the X- and the Y-axes are effected according to the principle of this invention. FIG. 7 is a perspective view of the positioning device, and FIGS. 8 and 9 are block diagrams of the control systems of the device of FIG. 7 in the directions along the X- and the Y-axes, respectively. In FIG. 7, the parts similar or corresponding to those of the conventional device of FIG. 2 are represented by the same reference numerals.

As shown in FIG. 7, a first table 34 carrying a work 8 fixedly thereon is translated horizontally along the X-axis by means of a first table driving mechanism 35. A second table 36 is translated horizontally along the Y-axis (perpendicular to the X-axis) by means of a second table Y-axis directional driving mechanism 37, and vertically along the Z-axis by means of a second table Z-axis directional driving mechanism 38. A third table 39, carrying a machining head 9 fixedly thereunder, is translated horizontally along the X- and the Y-axes by means of a third table X-axis directional driving mechanism 40 and a third table Y-axis directional driving mechanism 41, respectively. The machining head 9 radiates a laser beam 16 on the work 8 to effect machining. Thus, the relative position of the work 8 with respect to the head 9 along the X-axis is adjusted by means of the first table driving mechanism 35 and the third table X-axis driving mechanism 40, while that along the Y-axis is adjusted by means of the second table Y-axis driving mechanism 37 and the third table Y-axis driving mechanism 41. The vertical position of the head 9 relative to the work is controlled by the second table Z-axis driving mechanism 38.

As shown in FIG. 8, the command or target value Xr of the position of the first table 34 along the X-axis relative to the third table 39 and the head 9 is inputted to a control system 42 for the first table driving mechanism 35 via a smoothing filter 44 having a time constant Tf. The position of the first table 34 along the X-axis is controlled by the feedback or servo control system 42 having a position control gain Kpx1, a velocity control gain Kvx1, and an overall mass or inertia Mx1 including the work 8, the first table 34, and the movable parts of the first table driving mechanism 35 (including the reduction gear and the movable parts of the actuator). The follow-up error Xe of the first table 34, i.e., the difference between the actual position Xa1 of the first table 34 and the target position Xr thereof along the X-axis, is inputted to the control system 43 for the third table driving mechanism 40 along the X-axis as the position command value. The position of the third table 39 along the X-axis is thus controlled to the follow-up error Xe by the feedback or servo control system 43 having a position gain Kpx2, a velocity gain Kvx2, and an overall mass or inertial Mx2 including the machining head 9, the third table 39, and the movable parts of third table X-axis and Y-axis driving mechanisms 40 and 41 (including the reduction gears and the actuators thereof). Thus, the actual position Xa along the X-axis of the first table 34 relative to the third table 39 and the head 9, which is equal to the difference between the actual position Xa1 along the X-axis of the first table 34 and that Xa2 of the third table 39, is controlled to the target value Xr.

Similarly, the command or target value Yr of the position of the second table 34 along the Y-axis relative to the work 8 is inputted to a control system 45 for the second table Y-directional driving mechanism 37 via a smoothing filter 47 having a time constant Tf. The position of the second table 34 along the Y-axis is controlled by the feedback or servo control system 45 having a position control gain Kpy1, a velocity control gain Kvy1, and an overall mass or inertia My1 including the head 9, the third table 39, the third table driving mechanisms 40 and 41, the Z-directional second table driving mechanism 38, and the movable parts of the Y-directional second table driving mechanism 37 (including the reduction gear and the movable parts of the actuator). The follow-up error Ye of the second table 36, i.e., the difference between the actual position Ya1 of the second table 36 and the target position Yr thereof along the Y-axis, is inputted to the control system 46 for the Y-directional third table driving mechanism 41 as the position command value. The position of the third table 39 along the Y-axis is thus controlled to the follow-up error Ye by the feedback or servo control system 46 having a position gain Kpy2, a velocity gain Kvy2, and an overall mass or inertial My2 including the head 9, the third table 39 and the movable parts of the third table driving mechanisms 40 and 41 (including the reduction gears and the actuators thereof). Thus, the actual position Ya along the Y-axis of the third table 39 and the head 9 relative to the first table 34 and the work 8, which is equal to the sum of the actual position Ya1 along the Y-axis of the second table 36 and that Ya2 of the third table 39, is controlled to the target value Yr. It is noted that in the case of the control system along the Y-axis, a driving reaction Fy acts from the third table 39 to the second table 36, as indicated in FIG. 9.

The positioning along the Z-axis is effected by means of a conventional control system, and the description thereof is deemed unnecessary.

In the above, particular embodiments have been described. However, the principle of this invention is applicable to any positioning device by which the positional control along at least one direction is effected by means of at least two independently operated adjustment mechanisms having different mass or inertia. The appended claims are contemplated to cover any such modifications as fall within the true spirit and scope of this invention.

What is claimed is:

1. A positioning device for movably adjusting a relative position of a first body with respect to a second body, comprising:

at least two independent driving mechanisms for movably adjusting a relative position of said first body with respect to said second body along at least one direction, wherein a first driving mechanism has greater inertia than a second driving mechanism;

a first servo control system for controlling said first driving mechanism in accordance with a target value of a relative position of the first body with respect to the second; and a second servo control system for controlling said second driving mechanism utilizing as a target command value thereof an error of said first control system with respect to said target value, such that the relative position of said first body with respect to said second body is controlled to said target value of the relative position of the first body with respect to the second body.

2. A positioning device for movably adjusting a relative position of a first body with respect to a second body, comprising:

a first table for carrying said first body fixedly thereon;

a first driving mechanism for translating said first table at least along one direction;

a second table for carrying said second body fixedly thereon;

a second driving mechanism for translating said second table at least along said one direction, said second mechanism having a smaller inertia than said first driving mechanism;

a first servo control system for controlling said first driving mechanism, said first servo control system controlling a position of said first table along said one direction in accordance with a target value of a relative position of the first body with respect to the second body; and a second servo control system for controlling said second driving mechanism, said second servo control system controlling a position of said second table along said direction utilizing as a target command value of the position of the second table a positional error of said first control system with respect to said target value, such that the relative position of said first body with respect to said second body is controlled to said target value of the relative position of the first body with respect to the second body.

3. A positioning device as claimed in claim 2, wherein said first body comprises a work and said second body comprises a machining head of a machining device.

4. A positioning device as claimed in claim 2, wherein said first and second driving mechanisms translate said first and second body along a horizontal direction.

5. A positioning device as claimed in claim 2, wherein said first servo control system comprises a smoothing filter for smoothing said target value of the relative position of the first body with respect to the second.

6. A positioning device as claimed in claim 2, wherein said second servo control system utilizes as part of a target command value of a velocity of the second table an actual velocity of said first table.

7. A positioning device as claimed in claim 2, wherein said second servo control system utilizes as part of a target command value of a velocity of the second table a velocity error of said first control system.

8. A positioning device as claimed in claim 2, wherein said second servo control system utilizes as part of a target command value of a driving force of the second table an acceleration error of said first control system multiplied with an inertia of said second control system.

9. A positioning device for movably adjusting a relative position of a first body with respect to a second body, comprising:
- a first table for carrying said first body fixedly thereon;
- a first table driving mechanism for translating said first table at least along one direction X;
- a third table for carrying said second body fixedly thereon;
- a third table driving mechanism for translating said third table at least along two mutually perpendicular directions X and Y, one of said two mutually perpendicular direction, X, agreeing with said one direction X along which said first table is translated;
- a second table for carrying said third table fixedly thereon;
- a second table driving mechanism for translating said second table at least along said direction Y along which said third table is translated; wherein said third table driving mechanism has a smaller inertia than said first and second driving mechanisms;
- a first servo control system for controlling said first and second table driving mechanisms, said first servo control system controlling positions of said first and second tables along said directions X and Y, respectively, in accordance with target values of relative positions of the first body along directions X and Y, respectively, with respect to the second body; and
- a second servo control system for controlling said third table driving mechanism, said second servo control system controlling positions of said third table along said directions X and Y utilizing, as target command values of the positions of the third table, positional errors along said directions X and Y, respectively, of said first control system with respect to said target values, such that the relative positions of said first body with respect to said second body along said directions X and Y are controlled to said target values of the relative positions of the first body with respect to the second body along said directions X and Y.

10. A positioning device as claimed in claim 9, wherein said first body comprises a work and said second body comprises a machining head of a machining device.

11. A positioning device as claimed in claim 9, wherein said directions X and Y are two mutually perpendicular horizontal directions.

* * * * *